United States Patent [19]
Maher, Jr.

[11] Patent Number: 5,809,994
[45] Date of Patent: Sep. 22, 1998

[54] ELECTRONIC CONTROL SYSTEM FOR A HEATING APPARATUS

[75] Inventor: Charles A. Maher, Jr., Mustang, Okla.

[73] Assignee: Tridelta Industries, Inc., Mentor, Ohio

[21] Appl. No.: 711,929

[22] Filed: Sep. 11, 1996

[51] Int. Cl.⁶ .............................. A47J 27/00; H05B 1/02
[52] U.S. Cl. .......................... 126/374; 99/333; 219/492; 236/46 F
[58] Field of Search ................. 126/343.5, 351, 126/374; 236/46 R, 20 R, 46 F, 21.5; 99/328, 333; 219/492

[56] References Cited

U.S. PATENT DOCUMENTS

| | | | |
|---|---|---|---|
| Re. 29,609 | 4/1978 | Wadia et al. | 219/494 |
| 3,094,875 | 6/1963 | Fluegel | 73/359 |
| 3,217,633 | 11/1965 | Anetsberger | 99/327 |
| 3,326,692 | 6/1967 | Martino et al. | 99/111 |
| 3,525,299 | 8/1970 | Gouwens | 99/336 |
| 3,665,159 | 5/1972 | Becker et al. | 219/497 |
| 3,694,669 | 9/1972 | Witt et al. | 307/252 F |
| 3,732,468 | 5/1973 | Witt et al. | 307/149 |
| 3,800,779 | 4/1974 | Moore et al. | 126/374 |
| 3,863,049 | 1/1975 | Hinman | 219/389 |
| 3,866,472 | 2/1975 | Witt | 73/362 AR |
| 3,870,859 | 3/1975 | Price | 219/437 |
| 3,904,852 | 9/1975 | Rivelli et al. | 219/442 |
| 3,911,250 | 10/1975 | Price | 219/442 |
| 3,924,101 | 12/1975 | Beard | 219/490 |
| 3,938,498 | 2/1976 | Price | 126/374 |
| 3,950,632 | 4/1976 | Rivelli | 219/523 |
| 3,955,067 | 5/1976 | Eldridge | 219/497 |
| 3,979,056 | 9/1976 | Barnes | 235/92 MT |
| 3,998,146 | 12/1976 | Price | 99/403 |
| 4,032,749 | 6/1977 | Price | 219/442 |
| 4,036,995 | 7/1977 | Koether et al. | 426/233 |
| 4,058,703 | 11/1977 | Price | 219/492 |
| 4,077,690 | 3/1978 | Koether | 339/89 R |
| 4,097,707 | 6/1978 | Kobayashi et al. | 219/10.55 B |
| 4,195,667 | 4/1980 | Moore et al. | 137/637.1 |
| 4,197,581 | 4/1980 | Watrous et al. | 364/400 |
| 4,206,872 | 6/1980 | Levine | 236/46 R |
| 4,210,123 | 7/1980 | Moore et al. | 126/374 |
| 4,210,177 | 7/1980 | Moore et al. | 137/613 |
| 4,259,567 | 3/1981 | Moore et al. | 219/327 |
| 4,278,872 | 7/1981 | Koether et al. | 219/497 |
| 4,282,423 | 8/1981 | Volz | 219/490 |
| 4,296,632 | 10/1981 | Bloomer et al. | 73/362 AR |
| 4,301,509 | 11/1981 | Haase et al. | 364/557 |
| 4,304,177 | 12/1981 | Loeffler et al. | 99/333 |
| 4,320,285 | 3/1982 | Koether | 219/497 |
| 4,324,173 | 4/1982 | Moore et al. | 99/330 |
| 4,362,094 | 12/1982 | Polster | 99/342 |
| 4,377,733 | 3/1983 | Yamaguchi et al. | 219/10.55 B |
| 4,379,964 | 4/1983 | Kanazawa et al. | 219/492 |

(List continued on next page.)

FOREIGN PATENT DOCUMENTS 2 011 677  1/1982  United Kingdom.

OTHER PUBLICATIONS

OMEGA Catalog, 1989, pp. P–5 –P–8, P–10, P–11.
Ziemacki, Mike, "Fuzzy Logic Microcontroller," ECN.

*Primary Examiner*—William E. Wayner
*Attorney, Agent, or Firm*—Peter Hochberg; Mark Kusner

[57] ABSTRACT

A temperature control system for melting a solid cooking medium in a deep fat fryer comprising a chamber for containing a cooking medium; a heating surface within the chamber for heating the cooking medium; a heating device for heating the heating surface; a temperature sensor in the vicinity of the heating surface for sensing the temperature of the medium; and a temperature controller for controlling the heating device to control the amount of heat provided to the cooking medium, wherein the temperature controller includes: a system causing the heating device to generate uniform pulses of heat at a fixed duty cycle for a predetermined period of time, and a system for interrupting the operation of the heating device the predetermined period if the temperature of the cooking medium exceeds a first predetermined temperature.

10 Claims, 2 Drawing Sheets

U.S. PATENT DOCUMENTS

| | | | |
|---|---|---|---|
| 4,401,884 | 8/1983 | Kusunoki et al. | 219/492 |
| 4,420,006 | 12/1983 | Moore et al. | 134/167 R |
| 4,437,159 | 3/1984 | Waugh | 364/400 |
| 4,455,480 | 6/1984 | Matsumoto et al. | 219/497 |
| 4,465,228 | 8/1984 | Mori et al. | 236/20 A |
| 4,503,320 | 3/1985 | Polster | 219/441 |
| 4,549,527 | 10/1985 | Davis | 126/374 |
| 4,551,618 | 11/1985 | Payne | 219/510 |
| 4,570,054 | 2/1986 | Chidzey et al. | 219/490 |
| 4,585,925 | 4/1986 | Andre | 219/497 |
| 4,601,004 | 7/1986 | Holt et al. | 99/328 X |
| 4,636,949 | 1/1987 | Longabaugh | 364/400 |
| 4,663,710 | 5/1987 | Waugh et al. | 364/400 |
| 4,672,540 | 6/1987 | Waugh et al. | 364/400 |
| 4,688,475 | 8/1987 | Witt et al. | 99/325 |
| 4,740,888 | 4/1988 | Ceste, Sr. et al. | 364/187 |
| 4,742,455 | 5/1988 | Schreyer | 364/400 |
| 4,782,445 | 11/1988 | Pasquini | 364/400 |
| 4,812,625 | 3/1989 | Ceste, Sr. | 219/497 |
| 4,812,963 | 3/1989 | Albrecht et al. | 364/131 |
| 4,818,348 | 4/1989 | Stetter | 204/1 T |
| 4,845,978 | 7/1989 | Whitford | 73/73 |
| 4,858,119 | 8/1989 | Waugh et al. | 364/400 |
| 4,864,498 | 9/1989 | Pasquini et al. | 364/400 |
| 4,901,917 | 2/1990 | Littell, III | 236/46 R |
| 4,911,068 | 3/1990 | Koether et al. | 99/325 |
| 4,913,038 | 4/1990 | Burkett et al. | 99/331 |
| 4,968,515 | 11/1990 | Burkett et al. | 426/233 |
| 4,978,837 | 12/1990 | Eggleston | 219/497 |
| 5,043,860 | 8/1991 | Koether et al. | 364/138 |
| 5,044,262 | 9/1991 | Burkett et al. | 99/327 |
| 5,052,819 | 10/1991 | Baratta | 374/43 |
| 5,060,559 | 10/1991 | Winter | 99/325 |
| 5,170,042 | 12/1992 | Bunn | 219/497 |
| 5,220,864 | 6/1993 | Ejiri et al. | 99/330 |
| 5,235,148 | 8/1993 | Yamaguchi et al. | 219/10.55 B |
| 5,240,725 | 8/1993 | Akamatsu et al. | 426/233 |
| 5,352,865 | 10/1994 | Burkett et al. | 219/486 |
| 5,352,866 | 10/1994 | Cartwright et al. | 219/497 |
| 5,398,597 | 3/1995 | Jones et al. | 99/333 X |
| 5,454,511 | 10/1995 | Van Ostrand et al. | 236/46 R |
| 5,535,286 | 7/1996 | Ibbotson et al. | 382/109 |
| 5,575,194 | 11/1996 | Maher, Jr. et al. | 99/330 |
| 5,582,755 | 12/1996 | Maher, Jr. et al. | 219/492 |

ELECTRONIC CONTROL SYSTEM FOR A HEATING APPARATUS

FIELD OF THE INVENTION

The present invention relates generally to an electronic control system for use with a heating apparatus, and more particularly, to a control system for controlling heating of a deep fat fryer cooking system.

BACKGROUND OF THE INVENTION

Many commercial food vending establishments, such as fast food restaurants, use deep fat fryers to cook food products, such as potatoes, fish, chicken or the like. Such deep fat fryers typically include a large vat for holding a cooking medium, such as animal or vegetable oil. Many of these types of cooking mediums are solid at room temperature, and therefore must be melted to a liquid state. When melting solid cooking mediums, it is important that they are heated slowly to avoid generating hot spots that can scorch the cooking medium. In this respect, rapid heating of a cooking medium when solid can generate localized pockets or hot spots of liquid near the heating element, which can overheat before the remaining solid cooking medium melts. Such overheating can even occur with liquid shortening. To avoid such conditions, it has been known to initially heat the cooking medium by pulsing a heating element to allow heat to be gradually absorbed into the cooking medium. In fryer control systems known heretofore, this pulsing of the heating element would continue until the temperature of the cooking medium reaches a temperature limit, conventionally referred to as a "melt release temperature." Once the temperature of the melting shortening reaches or exceeds this temperature, the heat is turned full ON and remains ON until the temperature reaches or approaches a desired set temperature.

A problem with the foregoing melt mode of operation is that a localized zone of high temperature cooking medium can result in a premature exit from the melt mode and damage to the cooking medium, solid or liquid, due to the early application of continuous heat. In this respect, depending on the location of the temperature sensor relative to the heat source, it is possible that localized hot spots can develop within the cooking medium, or that air pockets or voids may still exist in a solid cooking medium in the area of the temperature sensor causing localized overheating of the cooking medium and an erroneous indication of the temperature of the entire vat. As a result, the heating element would be turned full ON, and a cold cooking medium is exposed to high heat. As indicated above, such condition may cause scorching of the cooking medium, or may even result in situations of heavy smoking or fire. Such conditions cause damage to the shortening itself and reduce its useful life.

The present invention overcomes this and other problems and provides an apparatus and method of heating cold cooking mediums wherein heat is applied to the cooking medium at a set duty cycle for a predetermined period of time while the temperature of the medium is monitored, and the duty cycle is modified in response to undesirable temperature conditions.

SUMMARY OF THE INVENTION

In accordance with the present invention, there is provided a temperature control system for heating a cold cooking medium in a deep fat fryer comprised of a chamber for containing a cooking medium, and a beating surface within the chamber for heating the cooking medium. A heating device is provided for heating the heating surface, and a temperature sensor is provided in the vicinity of the heating surface for sensing the temperature of the medium. A temperature controller controls the heating device to control the amount of heat provided to the cooking medium. The temperature controller includes a system causing the beating device to generate uniform pulses of heat at a fixed duty cycle for a predetermined period of time, and a system for interrupting the operation of the beating device during the predetermined period if the temperature of the cooking medium exceeds a first predetermined temperature.

In accordance with another aspect of the present invention, there is provided a temperature control system for a cooking apparatus having a cooking chamber for receiving a food product. The control system is comprised of a heating element within the cooking chamber for heating a cooking medium inside the cooking chamber, a sensing element in the vicinity of the heating element for sensing the temperature of the cooking medium, and a control unit for controlling the amount of beat provided to the cooking medium by the heating element. During a melt mode for melting a solid cooking medium, the heating element is pulsed at a predetermined duty cycle for a predetermined period of time, the pulsing of the heating element being interrupted if the temperature of the cooking medium exceeds a first predetermined temperature and being restarted when the temperature of the cooking medium drops below a second predetermined temperature.

In accordance with another aspect of the present invention, there is provided a method of heating a cold cooking medium comprised of the steps of: heating a surface within the chamber with uniform pulses of heat at a fixed duty cycle for a predetermined period of time, monitoring the temperature of the cooking medium in the vicinity of the surface during the predetermined period, interrupting the uniform pulses of heat if the temperature of the cooking medium in the vicinity of the surface exceeds a first predetermined temperature, and reinitiating the uniform pulses of heat when the temperature of the cooking medium in the vicinity of the surface drops below a second predetermined temperature.

In accordance with another aspect of the present invention, there is provided a method of operating a melt mode for heating a cooking medium. A desired temperature for a cooking medium to attain at the end of a melt mode is established. The cooking medium is heated for a predetermined period of time at a fixed heating rate, and the temperature of the cooking medium at the end of the predetermined period of time is determined. The difference between the temperature of the cooking medium at the end of the predetermined period of time and the desired temperature is determined, and the duration of the predetermined period of time is adjusted for the subsequent heatings to move the temperature of the cooking medium at the end of the predetermined period of time toward the desired temperature.

It is an object of the present invention to provide an electronic control system for controlling the heating of a cold cooking medium during a melt mode. It is another object of the present invention to provide an electronic control system as described above which monitors the temperature of the cooking medium during the melt mode, and adjusts the heating of the cooking medium in response to undesirable conditions.

A still further object of the present invention is to provide an electronic control system as described above which monitors the temperature of the cooking medium during the melt mode, and temporarily halts the heating of the cooking medium if the sensed temperature exceeds a predetermined amount.

A still further object of the present invention is to provide an electronic control system as described above which monitors the temperature of the cooking medium at the end of the melt mode and adjusts subsequent operations of the melt mode to adjust the temperature of the cooking medium at the end of a melt mode toward a desired final temperature.

A still further object of the present invention is to provide an electronic control system, wherein the electronic control system is adaptive to modify the melt mode so that subsequent operations of the melt mode result in the temperature of the cooking medium attaining a desired temperature at the end of the melt mode.

These and other objects and advantages will become apparent from the following description of a preferred embodiment taken together with the accompanying drawings and the appended claims.

BRIEF DESCRIPTION OF THE DRAWINGS

The invention may take physical form in certain parts and arrangement of parts, a preferred embodiment of which will be described in detail in the specification and illustrated in the accompanying drawings which form a part hereof, and wherein.

DETAILED DESCRIPTION OF PREFERRED EMBODIMENT

Figure 1:
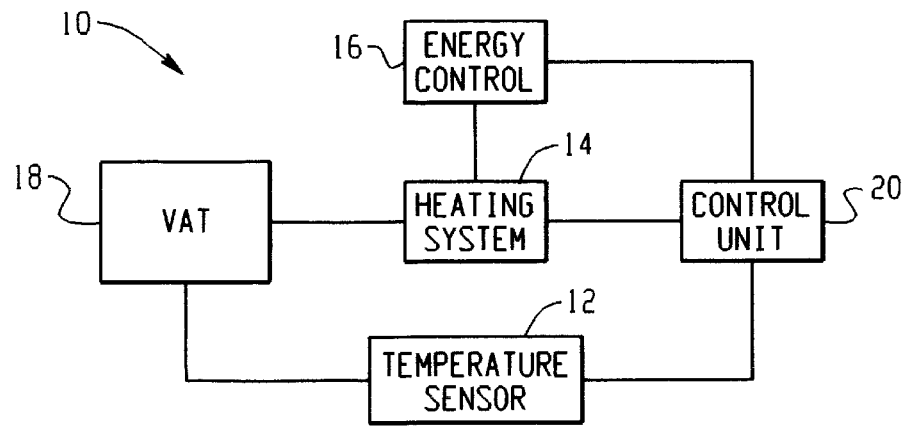
FIG. 1 is a block diagram of a deep fat fryer.

Referring now to the drawings, wherein the purpose is for illustrating a referred embodiment of the invention only, and not for the purpose of limiting same, the present invention relates generally to a control system for use with a heating apparatus for heating a cooking medium in a deep fat fryer. FIG. 1 shows a schematic block diagram of a deep fat fryer 10 comprised of a temperature sensor 12, a heating system 14, an energy control 16, a vat 18 and a control unit 20 that controls operation of deep fat fryer 10. The present invention finds particular application as part of a fryer control system of the type described in Assignee's co-pending patent application Ser. No. 08/538,187, now U.S. Pat. No. 5,575,194, which is a file wrapper continuation of Ser. No. 08/210,127, now abandoned, the complete disclosure of which is incorporated herein by reference.

Figure 2:
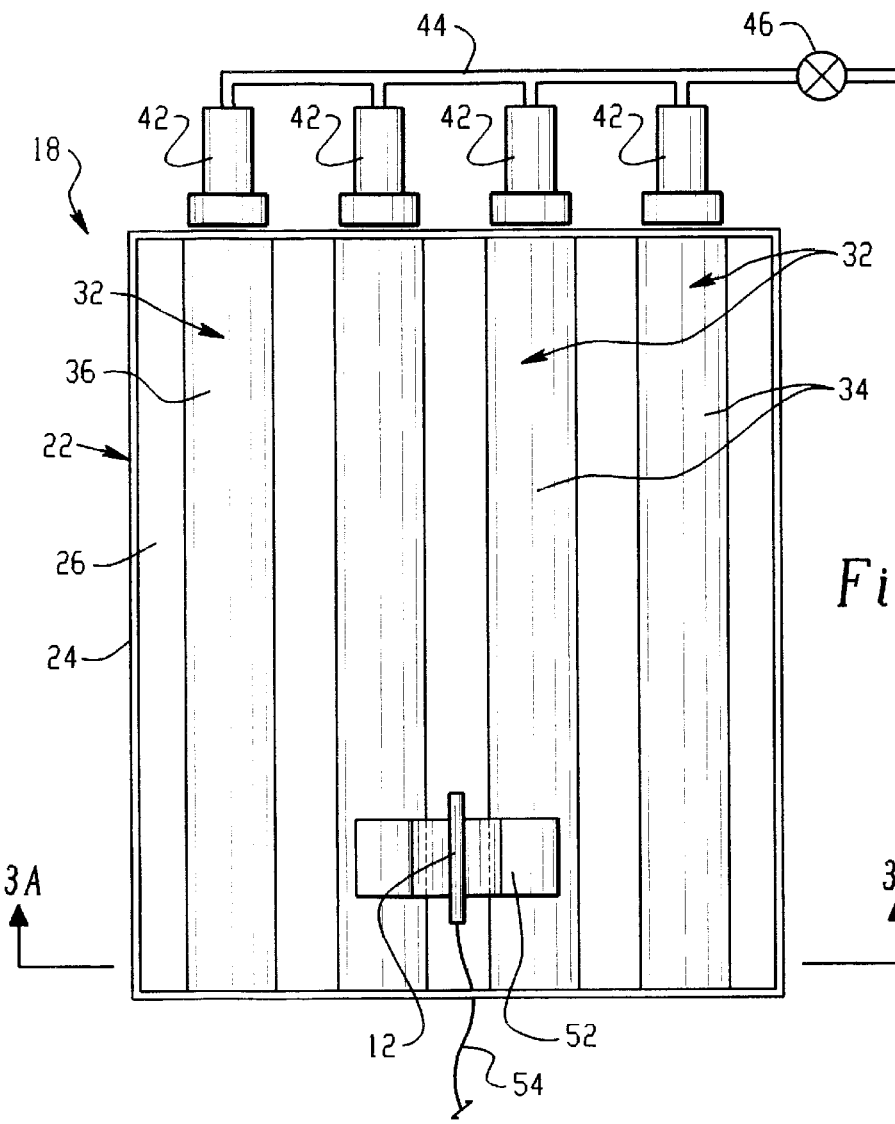
FIG. 2 is a top plan view of a deep fat fryer vat having a gas-fired tube heating system for heating the cooking medium.
Figure 3A:
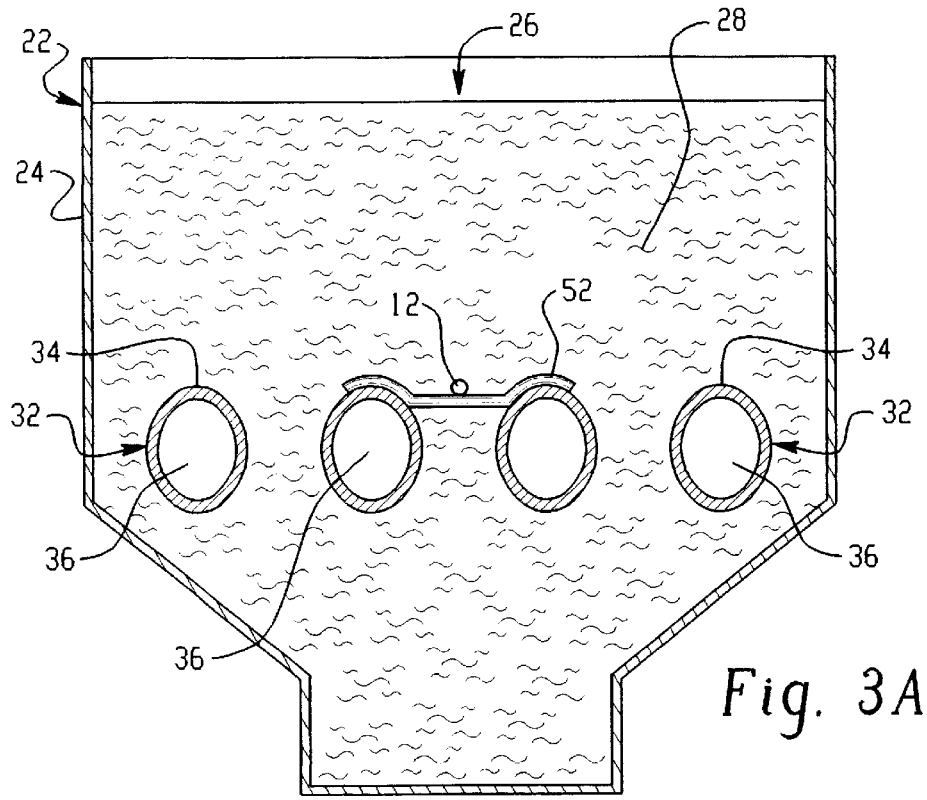
FIG. 3A is a sectional view taken along line 3A—3A of FIG. 2 showing a vat filled with a solid cooking medium at room temperature.
Figure 3B:
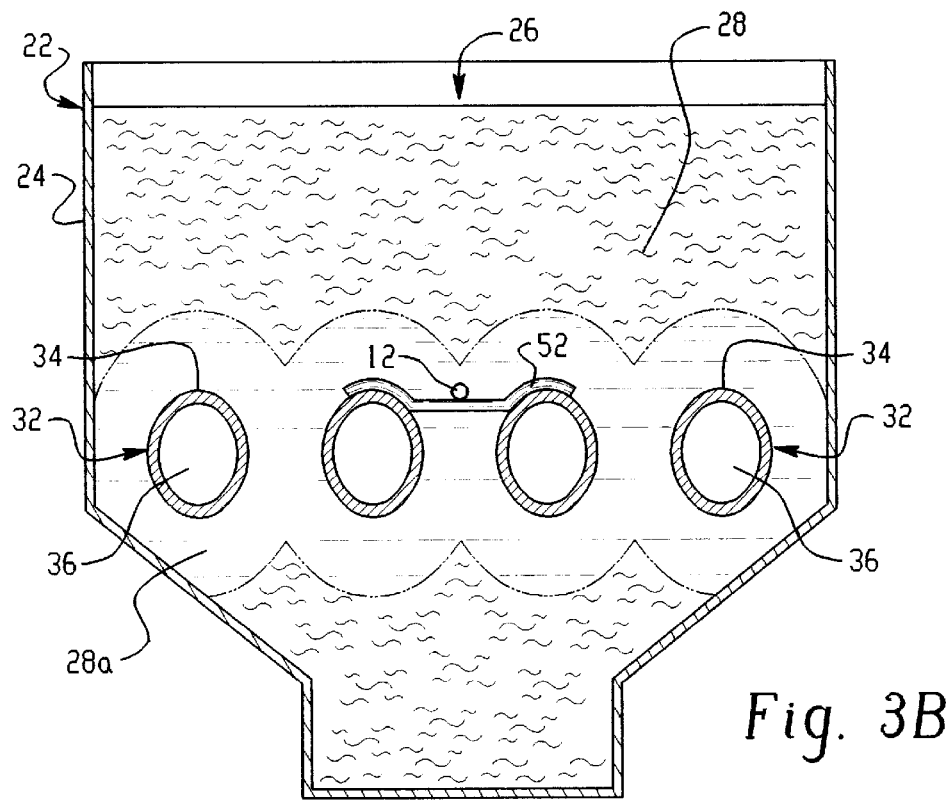
FIG. 3B is a view of the vat shown in FIG. 3A showing the cooking medium partially melted.

The present invention finds advantageous application with deep fat fryers having various types of heating systems for heating the cooking medium. FIGS. 2, 3A and 3B generally disclose a fryer 10 heated by a natural gas system. More specifically, vat 18 is defined by a tank 22. Tank 22 is formed by a tank wall 24 which defines an inner chamber 26 for holding a cooking medium, designated 28 in the drawings. In the embodiment shown, beating system 14 is comprised of four spaced apart beating tubes 32 which extend longitudinally through tank 22. Tubes 32 having an outer heating surface 34 and define passages 36 therethrough. Heating system 14 is comprised of a plurality of burners 42. A burner 42 is disposed at one end of each heating tube 34 to direct hot combustion gases through passages 36. In the embodiment shown, burners 42 are connected to a common gas line 44, which are controlled by a gas valve 46. A bracket 52 is mounted to the innermost heating tubes 32 and supports temperature sensor 12. Temperature sensor 12 is electrically connected to control unit 20 by electrical wire 54.

According to the present invention, control unit 20 includes a system for controlling the operation of heating system 14 during the melt mode of operation of the deep fat fryer 10 to heat a cold cooking medium to a desired "melt release temperature." As used herein, a "cold cooking medium" refers to a cooking medium at generally room temperature. At the beginning of a melt cycle, control system 20 is operable to cause burners 42 to operate at a predetermined duty cycle, wherein burners 42 are ON for a predetermined period of time and are OFF for a predetermined period of time. This mode of operation is established to operate for a predetermined period of time, hereinafter referred to as the "melt mode operating period." The initial "melt mode operating period" is empirically determined based upon the particular fryer system to be controlled, i.e., the vat size, type of shortening to be used and the heating capacity of the heating element. Based upon such information, an initial "melt mode operating period" can be established to ensure heating the particular cooking medium from room temperature to a temperature in excess of the melt release temperature. The duty cycle of the heating system during the melt mode is established to provide heat to the cooking medium at a relatively low rate. As indicated above, the melt mode is typically used during the start-up procedure (i.e., the melt mode) to heat a cold cooking medium. When cold, many types of cooking medium, such as shortening, are solid and thus must be gradually heated to avoid scorching or burning the cooking medium. Even with a low heating rate, localized hot spots can nevertheless occur in the melting cooking medium due to the relatively poor thermal heat conductivity of solid shortening. By way of example, Applicant has found that a ten (10) minute melt mode operating period, and a thirty-four (34) second heat duty cycle with eight (8) seconds ON and twenty-six (26) seconds OFF for solid shortening, and sixteen (16) seconds ON and eighteen (18) seconds OFF for liquid shortening to provide satisfactory results.

The present invention thus provides a control system for monitoring the temperature of the melting cooking medium 28 in the vicinity of heating elements 32 and for modifying the operation of heating system 14 in response thereto. Specifically, according to the present invention, control unit 20 is operable to monitor the temperature of cooking medium 28 in the vicinity of heating surfaces 34 of heating tubes 32. If the temperature of cooking medium 28 exceeds a first predetermined temperature, the operation (i.e., the duty cycle) of heating system 14 is interrupted. Control unit 20 then periodically checks the temperature of cooking medium 28, and restarts the operation of heating system 14 when the temperature of the cooking medium drops below a second predetermined temperature.

More specifically, control unit 20 interrupts operation of the heating system when the sensed temperature of the cooking medium in the vicinity of the heating tubes 32 approaches a temperature which might adversely affect cooking medium 28. In this respect, some shortening used in commercial deep fat fryers have a recommended upper operating temperature of approximately 380° F. Exceeding such temperature may affect the properties of the shortening. Accordingly, it is preferable to select as the "first predetermined temperature" a temperature which is high enough to indicate an unusual condition, yet not so high as to represent a real problem of damaging the cooking medium. In this respect, a temperature of approximately 320° F. is suggested as the "first predetermined temperature" for establishing when operation of heating system 14 is interrupted. 320° F. is a temperature which should not occur during a normal melt mode, yet it is still low enough so as not to represent a problem of damaging the cooking medium. If the operation of heating system 14 is interrupted when the temperature of cooking medium 28 in the vicinity of heating tube 32 reaches this temperature (i.e., 320° F.), the rise in temperature of the cooking medium as a result of the residual heat and latent in the system should not reach a level wherein properties of the cooking medium would deteriorate. Thus, the first predetermined temperature wherein the operation of the heating system is terminated, is preferably a temperature that is indicative of an abnormal condition, yet a temperature wherein residual heat within the system will not bring the temperature of the cooking medium to a destructive level.

Referring again to the operation of the melt mode, if the operation of heating system 14 is interrupted, control unit 20 periodically checks the temperature of cooking medium 28 to monitor the change in temperature of cooking medium 28. When the temperature of cooking medium 28 drops a predetermined amount below the first predetermined temperature, i.e., drops to a second predetermined temperature below the first predetermined temperature, the operation of heating system 14 is reinitiated for the remaining duration of the melt mode operating period. This second predetermined temperature or lower temperature is chosen to allow cooking medium 28 to cool for a short period of time. In this time, heat within molten cooking medium 28 is conducted through the medium and to the solid area of cooking medium 28, thereby further melting and softening same to provide a larger pool of molten cooking medium 28. A temperature of approximately 20° F. below the first predetermined temperature has been found to provide sufficient time for the heat in the system to dissipate into the solid cooking medium. In other words, in a preferred embodiment, the second predetermined temperature is approximately 300° F.

The present invention thus provides a system 10 and method of heating solid cooking medium 28 to avoid overheating the cooking medium 28 in the vicinity of the heating tubes 32. FIGS. 3A and 3B schematically illustrate the melt cycle heretofore described. In FIG. 3A, cooking medium 28 is shown as a solid mass. When heating tubes 32 are heated by burners 42, cooking medium 28 in the vicinity of heating tubes 32 begins to melt and change phase to a liquid as illustrated in FIG. 3B and designated 28a. Sensor 12 monitors the temperature of the liquid cooking medium 28a and provides an indication of the temperature of the cooking medium 28a near heating tubes 32. If the temperature of liquid cooking medium 28a, for any reason, exceeds 320° F., control unit 20 interrupts the melt cycle as indicated above, to protect cooking medium 28a from being overheated. This interruption or pause of the heating of cooking medium 28 allows heat already in the system to dissipate from the localized hot spots into the remaining cooler portion of the cooking medium, the result being an overall drop in the sensed temperature of the cooking medium. In this respect, it is not unusual in a melt cycle for the sensed temperature of the cooking medium to exceed the melt release temperature, as temperature sensor 12 senses localized hot spots near heating surfaces 34. As the heat dissipates throughout the cooking medium, the temperature drops back below the melt release temperature. The volume of melted cooking medium (in the case of solid shortening) expands and the heating of the cooking medium becomes more uniform and the temperature of the cooking medium approaches the melt release temperature at a more predictable rate.

In other words, once the wild temperature fluctuations caused by the localized hot spots subside, the temperature of cooking medium is below the melt release temperature and approaches such temperature at a generally uniform rate. The present invention is basically operable to monitor the temperature fluctuation and prevent further heating for a while if the upper temperature of these fluctuation reaches a level which might damage the cooking medium.

In accordance with another aspect of the present invention, control unit 20 includes an adaptive program operable to adjust the melt mode operating period to adjust the final temperature of the cooking medium at the end of a melt mode relative to the "melt release temperature." In this respect as indicated above, the initial melt mode operating period is empirically determined based upon parameters related to the fryer system and cooking medium. The initial melt mode operating period is preferably established to ensure that the temperature of the cooking medium at the end of the melt mode operating period exceeds the melt release temperature. Control unit 20 is operable to monitor the temperature of the cooking medium at the end of each melt mode operating period. Control unit 20 is programmed such that if the actual temperature of the cooking medium at the end of a melt mode operating period exceeds the desired melt release temperature by more than a predetermined amount, the duration of the melt mode operating period is reduced by a predetermined amount. Thus, with each subsequent operation of the melt mode, control unit 20 adapts the operating parameters of the melt mode to reduce the duration of the melt mode operating period. In other words, with each subsequent operation of the melt mode, the actual temperature of the cooking medium is determined and the melt mode operating period is adjusted to move the final temperature of a cooking medium at the end of a melt mode toward the desired melt release temperature. Control unit 20 will continue to adjust the duration of the melt mode operating period until such time as the duration of the melt mode operating period is the minimum required to ensure that the temperature of the cooking medium has attained the desired "melt release temperature" or a temperature related thereto. As will be appreciated, the adaptive feature of control unit 20 is programmed to be operable only during a true cold start, i.e., when the initial temperature of the cooking medium is at room temperature. This is to avoid adjustments to the melt mode operating period if the melt mode is started when the temperature of the cooking medium is well above room temperature. Under such conditions, the cooking medium would be heated for a full melt mode operating period which would cause the temperature of the cooking medium to greatly exceed the melt release temperature and trigger an unnecessary adjustment to the operating period.

As heretofore described, the adaptive feature of control unit 20 is operable to adjust the melt mode operating period by reducing the operating period in the event that the melt mode operating period is longer than necessary to bring the temperature of the cooking medium up to the melt release temperature.

The adaptive program of control unit 20 also preferably includes a program to extend the melt mode operating period in the event that the temperature of the cooking medium does not attain the desired melt release temperature at the end of the melt mode operating period. In this respect, various conditions external to fryer 10, or internal to fryer 10, may result in the temperature of the cooking medium not attaining the melt release temperature by the end of the melt mode operating period.

In this event, control unit 20 is programmed to monitor the temperature of cooking medium 28 at the end of the melt mode operating period. In the event that the temperature of the cooking medium has not reached the melt release temperature, heating of the cooking medium continues at the pre-established duty cycle. The temperature of the cooking medium is periodically monitored, and the heating continues, until the temperature of the cooking medium reaches the melt release temperature, at which point, control unit 20 exits melt mode operation and applies heat full ON to heat the cooking medium to a desired temperature. According to the present invention, control unit 20 monitors the extra time required to bring the temperature of the cooking medium to the melt release temperature. This additional time period is added to the previous melt mode operation period to establish a new melt mode operating period for any subsequent melt mode operation. This adaptive feature of control unit 20 thus ensures that any change in the environment or fryer 10 that might affect the heating of the cooking medium is taken into account for subsequent operations of the melt mode. The present invention thus provides an adaptive feature which constantly modifies, i.e., adapts, the melt mode to take into account the then existing operating fryer conditions and environmental conditions which can affect the initial heating of the cooking medium.

In accordance with a still further aspect of the present invention, control unit 20 preferably includes a calculation program wherein control unit 20, based upon known thermodynamic principles and known characteristics regarding the heating capability of burners 42 of fryer 10, determines the initial melt mode operating period, as well as the heating duty cycle for a particular type of cooking medium, based upon input parameters. In this respect, control unit 20 preferably includes input means allowing the user to input parameters regarding a particular cooking medium, specifically the specific heat of the cooking medium as well as its weight. Knowing the capacity of vat 18, and with the parameters regarding the particular cooking medium used, control unit 20 can calculate a theoretical thermal energy required to heat the particular cooking medium from approximately room temperature to a desired melt release temperature, which melt release temperature may also be related to the particular cooking medium and may be input or stored on control unit 20. In this respect, by inputting parameters regarding the cooking medium, control unit 20 can calculate an initial melt mode operating period and a heat duty cycle appropriate to such cooking medium. As indicated above, the calculation program preferably establishes an initial melt mode operating period which will cause the temperature of the cooking medium to exceed the melt release temperature. Thereafter, control unit 20 using the adaptive program therein can shorten the duration of the melt mode operation period based upon the amount of overshoot relative to the melt release temperature which might occur during each melt mode.

The present invention thus provides an apparatus and method for operating a melt mode which allows a fryer 10 to adapt to its setting and environment, and further adapt to changes in an operation condition within fryer 10. The present invention provides an electronic control for operating a melt mode for heating a cooking medium wherein the controller monitors the temperature of the cooking medium during the melt mode to prevent overheating of the cooking medium during the melt mode, at the same time, minimizes the duration of the melt mode to enable the heating unit to rapidly heat the cooking medium once the cooking medium has attained the melt release temperature.

The foregoing description is a specific embodiment of the present invention. It should be appreciated that this embodiment is described for purposes of illustration only, and that numerous alterations and modifications may be practiced by those skilled in the art without departing from the spirit and scope of the invention. For example, the predetermined temperature limits could be programmed at levels different from those identified above without deviating from the present invention. Still further, specific temperature limits could be programmed into control unit 20 for specific types of cooking medium, wherein the temperature limits used during a melt cycle would be based upon the cooking medium being used. It is intended that all such modifications and alterations be included insofar as they come within the scope of the invention as claimed or the equivalents thereof.

Having described the invention, the following is claimed:

1. A temperature control system for heating a cold cooking medium in a deep fat fryer comprising:
    a chamber for containing a cooking medium;
    a heating surface within said chamber for heating said cooking medium;
    a heating device for heating said heating surface;
    a temperature sensor in the vicinity of said heating surface for sensing the temperature of said medium; and
    a temperature controller for controlling said heating device to control the amount of heat provided to said cooking medium, wherein said temperature controller includes:
        a system causing said heating device to generate uniform pulses of heat at a fixed duty cycle for a predetermined period of time,
        a system for interrupting the operation of said heating device said predetermined period if the temperature of said cooking medium exceeds a first predetermined temperature, and
        a system to reinitiate said fixed duty cycle of said heating device, once the temperature of said cooking medium drops below a second predetermined temperature.

2. A temperature control system as defined in claim 1, wherein said second predetermined temperature is below said first predetermined temperature.

3. A temperature control system as defined in claim 2, wherein said first predetermined temperature is below the upper operating limiting of said cooking medium.

4. A method of beating a cold cooking medium comprised of the steps of:
    heating a surface within said chamber with uniform pulses of heat at a fixed duty cycle for a predetermined period of time;
    monitoring the temperature of said cooking medium in the vicinity of said surface during said predetermined period;
    interrupting the uniform pulses of heat if the temperature of said cooking medium in the vicinity of said surface exceeds a first predetermined temperature; and
    reinitiating said uniform pulses of heat when the temperature of said cooking medium in the vicinity of said surface drops below a second predetermined temperature.

5. A temperature control system as defined in claim 4, wherein said second predetermined temperature is below said first predetermined temperature.

6. A temperature control system as defined in claim 5, wherein said first predetermined temperature is below the upper operating limiting of said cooking medium.

7. A temperature control system for a cooking apparatus having a cooking chamber for receiving a food product comprising:

a heating element within said cooking chamber for beating a cooking medium inside the cooking chamber;

a sensing element in the vicinity of said heating element for sensing the temperature of the cooking medium; and a control unit for controlling the amount of heat provided to the cooking medium by the heating element, wherein during a melt mode for heating a cold cooking medium said heating element is pulsed at a predetermined duty cycle for a predetermined period of time, said pulsing of said heating element being interrupted if the temperature of said cooking medium exceeds a first predetermined temperature and being restarted when the temperature of said cooking medium drops below a second predetermined temperature.

8. A temperature control system as defined in claim 7, wherein said second predetermined temperature is below said first predetermined temperature.

9. A temperature control system as defined in claim 8, wherein said first predetermined temperature is below the upper operating limiting of said cooking medium.

10. A method of operating a melt mode for heating a cooking medium comprising the steps of:

establishing a desired temperature for a cooking medium to attain at the end of a melt mode;

heating said cooking medium for a predetermined period of time at a fixed heating rate;

determining the temperature of said cooking medium at the end of said predetermined period of time;

determining the difference between the temperature of said cooking medium at the end of said predetermined period of time and the desired temperature; and adjusting the duration of said predetermined period of time for subsequent beatings to move the temperature of said cooking medium at the end of said predetermined period of time toward said desired temperature.

\* \* \* \* \*